Patented Apr. 21, 1925.

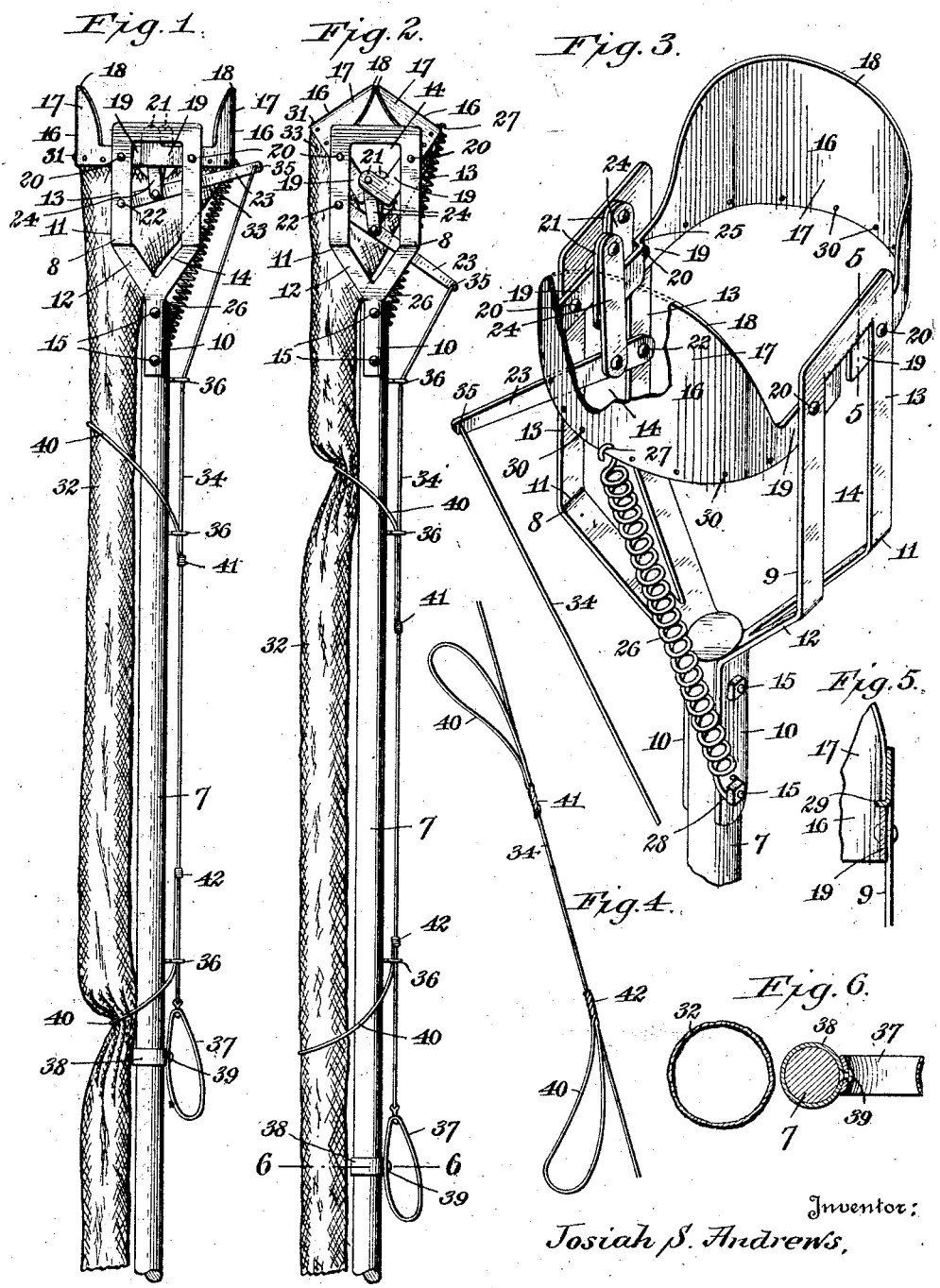

1,534,756

UNITED STATES PATENT OFFICE.

JOSIAH S. ANDREWS, OF BUFFALO, NEW YORK.

FRUIT PICKER.

Application filed June 1, 1921. Serial No. 474,118.

*To all whom it may concern:*

Be it known that I, JOSIAH S. ANDREWS, a citizen of the United States, residing at Buffalo, in the county of Erie and State of New York, have invented certain new and useful Improvements in Fruit Pickers, of which the following is a specification.

This invention relates to new and useful improvements in fruit pickers, and more particularly to that type having the picking mechanism at the end of a pole and being equipped with a flexible tube to receive the fruit.

One of the objects of my invention is the production of a fruit picker of simple construction, which is comparatively inexpensive, and highly efficient in operation.

Another object of my invention is to provide picker mechanism at the upper end of a pole or supporting rod which is comparatively light in weight so that no undue effort will be required in handling the device and so that it may be positioned with ease at the proper points for severing fruit from the branches of a tree.

The invention consists in the novel features of construction, and in the arrangement and combination of parts to be hereinafter described and more particularly pointed out in the subjoined claims.

In the drawings:—

Fig. 1 is a side elevation of a fruit picker constructed according to my invention showing the cutting members or elements in opened position.

Fig. 2 is a similar view showing the cutting members or elements in cutting position.

Fig. 3 is a broken perspective view of the upper end of the device.

Fig. 4 is a perspective view of a portion of the fruit retarding means.

Fig. 5 is a vertical section taken on line 5—5, Fig. 3.

Fig. 6 is a cross section taken on line 6—6, Fig. 2.

Reference being had to the drawings in detail, like numerals refer to like parts in the several figures.

The reference numeral 7 designates a supporting-rod having a frame secured to its upper end, said frame comprising two members 8 and 9, which are stamped of sheet metal of proper gauge and are exact counterparts. Each frame member comprises a transversely-curved securing part 10 and a supporting part 11 having a portion adjacent said securing part gradually widened upwardly, as at 12, and directed upwardly and outwardly at an angle from said securing part, and a parallel-sided part 13 extending upwardly from the upper end of the upwardly and outwardly-directed part 12.

With a view of reducing the weight of the supporting parts 11, each is provided with an opening 14 extending from a point near its end downwardly through the parallel-sided part 13 and into the upwardly and outwardly-directed part 12 so as to terminate a short distance above the securing part 10. The securing parts 10 of the two frame members are curved transversely to conform to the transverse curvature of the supporting-rod and are positioned at opposite sides of said rod and secured thereto by means of bolts 15. With the two frame members 8 and 9 secured to the supporting rod, the upper portions of the frame members are spaced apart a considerable distance, due to the employment of the upwardly and outwardly-directed parts 12.

Cutters 16 are pivotally connected to the frame members, each cutter having a transversely curved body portion 17 provided with a cutting edge 18 and arms 19 extending inwardly from said body portion 17 between the two frame members 8 and 9, the arms 19 of each cutter being secured to the frame members near one vertical edge thereof, by means of pivot pins 20. The cutting edge 18 of each cutter 16 is curved along the greater portion of its length and has a straight or almost straight portion centrally between its ends, from which portion it curves downwardly and merges into the upper edges of the arms 19. The cutting edge of each cutter, of course, is formed along the curved body portion 17 thereof, but the straight portions formed centrally between the ends of this edge permit the edges of the two cutters to be brought in contact along portions of their lengths so that it is not absolutely necessary that the stems of the fruit being cut are placed exactly centrally between the ends of the cutters, and the fruit can be easily severed from a tree by placing the stems of the fruit at any point between the straight portions of the cutting edges. The arms 19 of each cutter lie in contact with the inner faces of the frame members, and the arms of both the cutters in contact with one of said frame members, in the drawing, frame member 8, have upstanding lugs 21 at their extremities. The pivot pins 20 of all arms 19 are located a short distance from their extremities, the pins of the arms at each side of the device being spaced apart with the ends of the arms 19 extending into the space so formed.

Pivotally secured to one of the frame members, as at 22, is an actuating lever 23 which extends from the pivot 22 across said frame member and projects outwardly therefrom, and connecting said lever with the lugs 21 are links 24, one of the arms 19 provided with a lug 21 being offset beyond its pivot 20, as at 25, thus providing proper clearance for the link 24 connected to the lug 21 of the other arm. In order to keep the cutters 16 in their open position, as shown in Figs. 1 and 3, one end of a retractile spring 26 is secured to the lower end of one cutter 16, preferably centrally between its ends, as at 27, the other end of said spring being secured to the supporting-rod 7, preferably by means of the nut applied to one of the bolts 15, as at 28. Through the medium of the arms 19 of said cutter and the links 24 connecting both cutters with the actuating lever, said actuating lever is retained in its upwardly-inclined position, as shown in Figs. 1 and 3, while the cutters 16 are retained in horizontal position with the curved body portions 17 thereof extending outwardly from between the frame members 8 and 9. In order to prevent the retractile spring 26 pulling the cutters downwardly beyond the horizontal position shown in Fig. 1, the frame member 9 is provided with an inwardly-directed flange 29 against which the upper edges of the arms 19 pivotally secured to said frame member bear, said flange serving as a stop for said arms and limiting downward movement of the parts of the cutters arranged outside of said pivots.

Along the lower edge of each cutter, small perforations 30 are provided, through which suitable fasteners 31 are passed to fasten the upper end of a flexible open-ended bag or tube 32 thereto, said bag or tube being widened at its upper end, as at 33, to form a hopper-like portion extending across the opening formed between the two cutters 16. The hopper-like portion of said tube or bag is positioned between the two frame members 8 and 9, while the bag or tube below the hopper is of even width or diameter downwardly.

34 designates an actuating cord or wire fastened at one end to the end of the actuating lever 23, as at 35, and being directed downwardly therefrom and passed through guides, preferably in the form of screw eyes 36 threaded into the supporting rod 7', the lower end of said cord or wire being fastened to a hand-loop 37 formed of canvas, leather or other suitable material, which is secured to a guide ring or loop 38, as at 39, slidable on the supporting-rod.

Fastened to the actuating cord or wire are loops 40, the point of fastening of one of said loops being beneath one of the screw eyes 36, as at 41, and the point of fastening of the other loop being above another screw eye, as at 42. Said loops are preferably formed of piano wire or other material of inherent flexibility and possessing the quality of returning and maintaining a curved condition or contour so as to keep said loops open except when forcibly closed. One of the loops 40 extends downwardly through a screw eye 36 to the point of attachment 41 and the other upwardly through a screw eye 36 to the point of attachment 42, each loop having the bag or tube 32 extending therethrough.

With the parts in normal position shown in Fig. 1, the upper end of the fruit picker may be thrust upwardly into a tree to position an apple or other large fruit between the two cutters 16. Upon drawing downwardly on the hand loop 37, the actuating lever 23 will be swung downwardly on its pivot through the medium of the cord or wire 34, thus swinging the cutters upwardly and inwardly to bring the cutting edges 18 thereof together, whereupon the stem of the apple or other fruit will be severed and the apple or other fruit dropped into the bag or tube 32. It is to be noted that the downward pulling of the actuating cord or wire 34 causes the upper loop 40 to be drawn downwardly through its co-acting screw eye, thus contracting the loop around the bag and preventing the apple or other fruit from dropping the full distance through the bag or tube. When releasing the hand loop 37, the retractile spring 26, acting to draw the actuating lever upwardly, will pull the actuating cord or wire 34 upwardly, with the result that the upper loop 40 of the fruit retarding device will be released and open up, while the lower loop 40 will be drawn upwardly through its co-acting screw eye and be contracted around the bag or tube 32, thus allowing the apple or other fruit momentarily held by the upper loop to descend in the bag or tube where it will be momentarily retained by the contracted lower loop 40. In this manner the drop of the fruit is limited to certain distances, which guards against bruising.

When positioning the picker within the tree to cut off another apple or other fruit, the supporting rod is positioned with the apple retained in the bag by the lower loop 40. Upon drawing the hand loop 37 downwardly to actuate the cutters and sever the stem of the second apple or other fruit, the lower loop will be permitted to expand and allow the apple or other fruit to pass downwardly through the bag or tube and be delivered to the floor or into a suitable receptacle provided at the lower end of said bag or tube. At the same time, the apple last picked from the tree will enter the bag or tube and be momentarily retained by the contracted upper loop 40.

Owing to the construction of the cutters, whereby a comparatively large space is provided between them and the bag or tube is formed with a hopper-like upper end, fruit growing in clusters can be picked as readily and conveniently as single fruit, especially since the upward and inward movement of the cutters, when in cutting position, do not measurably reduce the entrance opening at the upper end of the bag or tube.

It is of course understood that the supporting-rod may be formed in sections and an additional section or sections added when picking fruit from tall trees, and in that case the hand loop 37 with its guide loop 38 may be lowered on the supporting rod and a section of actuating cord or wire attached to the cord or wire shown, either with or without loops 40. It is, of course, understood that if loops are employed on an additional section of actuating cord or wire, they will be arranged similar to the loops shown in the drawings; that is the upper loop on the additional section will be similar to the upper loop shown on the drawings, while the lower loop on the additional section will be similar to the lower loop shown on the drawings.

Having thus described my invention, what I claim is:—

1. A fruit picker comprising a rod, a frame secured to the upper end of said rod and having two frame members spaced apart above said rod, oppositely-curved cutters having arms extending from opposite ends pivotally secured at points distant from their extremities to said frame members, an actuating lever pivotally connected to one of said frame members, a link connecting one arm of each of said cutters with said actuating lever, and means for actuating said lever from a low point on said rod.

2. A fruit picker comprising a rod, a frame having two frame members secured to the upper end of said rod and having portions of said frame members extending upwardly above said rod and spaced apart, curved cutters disposed laterally of said frame and having inwardly-directed arms at opposite ends pivotally connected at points distant from their extremities to said frame members, the arms at corresponding ends of said cutters having upwardly-directed lugs, an actuating lever pivotally secured to one of said frame members in a plane beneath the plane in which the pivots of said arms are disposed, links connected to each of said upstanding lugs and extending downwardly therefrom, said links having their lower ends pivotally connected to said actuating lever, and a flexible actuating element extending downwardly along said rod and being guided thereon, said actuating element having connection at its upper end with said actuating lever.

3. A fruit picker comprising a rod, a frame formed of two frame members secured to said rod and having their upper portions spaced apart, a pair of curved cutters having arms at opposite ends pivotally secured to the spaced portions of said frame members, the pivots of said pair of cutters being spaced apart and the arms thereof being extended into the space between said pivots, one of said members having an inwardly-directed flange against which the upper edges of the arms pivoted thereto bear, the arm of one of said cutters pivotally secured to the other frame member being offset, an actuating lever pivotally connected to said last-mentioned frame member, links pivotally connecting said actuating lever with the arms pivoted to said last-mentioned frame member, a flexible element secured to the outer end of said actuating lever, and guides extending from said rod through which said flexible element is passed.

4. A fruit picker comprising a rod, a frame secured to the upper end of said rod comprising two frame members secured to said rod at diametrically-opposite points, said frame having upwardly and outwardly-directed portions extending from the upper end of said rod and parallel-sided portions extending from said upwardly and outwardly-directed portions, the parallel-sided portion of one of said frame members having an inwardly-directed flange, a pair of cutters having curved body portions provided with upper cutting edges and arms at opposite ends of each body portion extending inwardly between the parallel-sided portions of said frame members, said arms being pivotally connected to said frame members, the arms at one side of said frame having their upper edges normally in contact with said inwardly-directed flange and the arms at the opposite side of the frame having upstanding lugs, an actuating lever secured to the last-mentioned side of said frame, links connecting said actuating lever with the upper ends of said upstanding lugs, means for operating said actuating lever from a low point of said rod, and a retractile spring connected to one of said cutters and directed inwardly and downwardly for connection to said rod.

5. A fruit picker comprising a rod, a frame at the upper end of said rod having spaced members, cutters having curved body portions and arms at opposite ends of each body portion extending into said frame and being pivotally connected thereto at points distant from the extremities of said arms, the extremities of said arms at one side of the frame having upstanding lugs and one of said arms being offset and overlapping the other in spaced relation, an actuating lever pivotally connected to the last-mentioned side of said frame in a plane beneath said arms, a link pivotally connecting the actuating lever with the upper end of the lug on said overlapping arm, and a link pivotally connecting said actuating lever with the upper end of the lug on the overlapped arm and extending through the space between said arms.

In testimony whereof I affix my signature.

JOSIAH S. ANDREWS